US010123283B1

(12) United States Patent
Jorgovanovic

(10) Patent No.: US 10,123,283 B1
(45) Date of Patent: Nov. 6, 2018

(54) SYSTEM FOR REDUCING INTERFERENCE BETWEEN COMMUNICATION DEVICES

(71) Applicant: AMAZON TECHNOLOGIES, INC., Seattle, WA (US)

(72) Inventor: Milos Jorgovanovic, Mountain View, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/651,428

(22) Filed: Jul. 17, 2017

Related U.S. Application Data

(63) Continuation of application No. 15/265,746, filed on Sep. 14, 2016, now Pat. No. 9,769,767.

(51) Int. Cl.
| | |
|---|---|
| *H04W 52/24* | (2009.01) |
| *H04B 17/318* | (2015.01) |
| *H04B 17/345* | (2015.01) |
| *H04W 4/80* | (2018.01) |
| *H04W 84/12* | (2009.01) |

(52) U.S. Cl.
CPC ........ *H04W 52/243* (2013.01); *H04B 17/318* (2015.01); *H04B 17/345* (2015.01); *H04W 4/80* (2018.02); *H04W 52/241* (2013.01); *H04W 52/245* (2013.01); *H04W 84/12* (2013.01)

(58) Field of Classification Search
CPC ............. H04W 52/245; H04W 52/243; H04W 52/367; H04W 52/241; H04W 72/082; H04W 52/08; H04W 52/143; H04W 52/265; H04W 72/042; H04W 72/1231

USPC ....... 455/522, 69, 68, 67.11, 7.13, 500, 517, 455/445, 507, 515, 550.1, 426.1, 426.2, 455/414.1–414.4, 422.1, 403, 226.3, 455/452.1; 370/329, 328, 252, 310
See application file for complete search history.

(56) References Cited

U.S. PATENT DOCUMENTS

| | | | |
|---|---|---|---|
| 2013/0329821 A1 | 12/2013 | Chen et al. | |
| 2017/0171870 A1* | 6/2017 | Wang ................. | H04W 72/085 |

OTHER PUBLICATIONS

Ferguson, Keith, "Notice of Allowance dated May 24, 2017", U.S. Appl. No. 15/265,746, The United States Patent and Trademark Office, May 24, 2017.

* cited by examiner

*Primary Examiner* — Keith Ferguson
(74) *Attorney, Agent, or Firm* — Lindauer Law, PLLC

(57) ABSTRACT

Interference from communication associated with a first device on communication by a second device may be reduced by modifying the transmission power of the first device. The amount by which the transmission power of the first device is reduced may be determined based on the minimum signal strength value for the first device that maintains a threshold level of quality and the maximum transmission power for the first device that corresponds to a threshold level of interference to the second device. Based on the maximum transmission power, a target change to the transmission power of the first device may be determined. The transmission power of the first device may be reduced by the lesser of: an amount corresponding to the target change or an amount that would reduce the signal strength for the first device to the minimum signal strength value.

20 Claims, 6 Drawing Sheets

US 10,123,283 B1

SYSTEM FOR REDUCING INTERFERENCE BETWEEN COMMUNICATION DEVICES

PRIORITY

This application is a continuation of, and claims priority to, pending U.S. patent application Ser. No. 15/265,746, filed on Sep. 14, 2016, entitled "System for Simultaneous Wireless Communication". application Ser. No. 15/265,746 is incorporated by reference herein in its entirety.

BACKGROUND

Some devices include multiple wireless radios, such as devices configured to use both Wi-Fi® and Bluetooth® protocols. These devices may be operated simultaneously.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
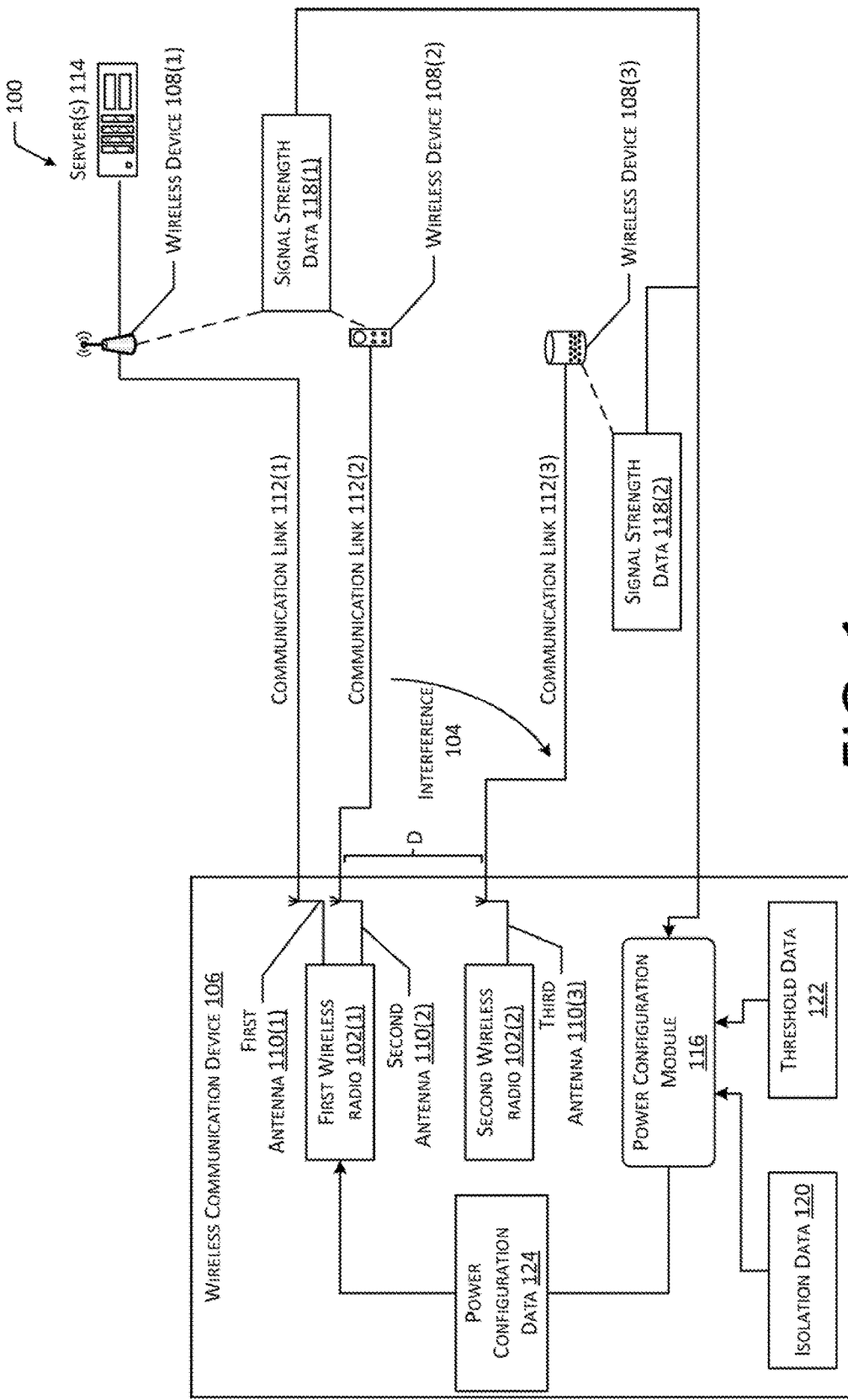
FIG. 1 depicts an implementation of a system for configuring the transmission power of a first wireless radio to at least partially reduce interference from the first wireless radio on communications using a second wireless radio.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Some wireless communication devices may include multiple wireless radios, each radio having a respective transmitter, receiver, radio frequency chain, and one or more antennae. For example, a device may include a first wireless radio that communicates using Wi-Fi® and Wi-Fi® Direct protocols and a second wireless radio that communicates using Bluetooth® and Bluetooth® Low Energy protocols. Devices that include multiple wireless radios may experience degradation in quality and signal strength when the radios are used simultaneously, such as when performing full duplex communication. For example, when a first wireless radio transmits a signal, this transmission may interfere with the ability of the second wireless radio to send or receive signals to or from other devices. Typically, interference between multiple wireless radios may be mitigated by isolating the respective antennae used by each radio by a physical distance sufficient to at least partially prevent the interference. However, when the radios are housed within a single device, it may not be possible to separate the antennae by a distance sufficient to prevent the transmissions of one radio from interfering with another radio. As a result, many devices that include multiple wireless radios will not be configured to operate different radios simultaneously and will instead operate the radios via time division duplex communication.

Described in this disclosure are techniques for facilitating simultaneous (e.g., full duplex) operation of multiple wireless radios by reducing the interference to communications using a first wireless radio caused by operation of a second wireless radio. In some implementations, a reduction in interference may be achieved by reducing the transmission power of the second wireless radio to a level that will at least partially eliminate the interference.

For example, a first wireless radio may communicate using one or more Bluetooth® protocols, which may also include, without limitation, communication using a Bluetooth® Low Energy protocol. A Bluetooth® protocol may include a protocol compliant with at least a portion of one or more of Institute of Electrical and Electronics Engineers (IEEE) specification 802.15.1 or a standard promulgated by the Bluetooth Special Interest Group. A second wireless radio may communicate using one or more Wi-Fi® protocols, which may also include, without limitation, communication using a Wi-Fi® Direct protocol. A Wi-Fi® protocol may include a protocol compliant with at least a portion of Institute of Electrical and Electronics Engineers IEEE specification 802.11. Continuing the example, the first wireless radio may communicate with one or more devices within an environment using one or more Bluetooth® communication links. The second wireless radio may communicate with an access point and one or more other devices within the same environment or remote from the environment using a Wi-Fi® protocol or a Wi-Fi® Direct protocol. In some cases, the second wireless radio may use multiple antennae to communicate the Wi-Fi® and Wi-Fi® Direct protocols.

Due to a close spatial proximity between the antenna(e) associated with the first wireless radio and the antenna associated with the second wireless radio, insufficient physical isolation may be present to prevent transmissions using the first wireless radio from interfering with communication using the second wireless radio. However, in some cases, a wireless radio using a Wi-Fi® protocol may be sufficiently close to an access point or other device in communication with the wireless radio that the transmission power of the wireless radio may be reduced without reducing the quality or signal strength of the Wi-Fi® communications below a threshold level of quality. Therefore, in such cases, reduction of the transmission power of the second wireless radio may reduce the interference caused by the second wireless radio on communications using the first wireless radio without reducing the quality or signal strength of communications using the second wireless radio below the threshold quality.

To reduce or eliminate interference from the second wireless radio on communications using the first wireless radio, a target transmission power for the second wireless radio that would at least partially mitigate the interference may be determined. The target transmission power may be based on characteristics of the antennae or the second wireless radio and the signal strengths of communications using the first wireless radio. A maximum change in the signal strength for the second wireless radio may also be determined, the maximum change representing the amount by which the signal strength may be reduced, such as by reducing the transmission power, without reducing the quality of communications using the second wireless radio below a threshold quality. If the target transmission power may be achieved without exceeding the maximum change in signal strength, the transmission power of the second wireless radio may be reduced to the target transmission power to mitigate interference on the first wireless radio. If the reduction to the target transmission power would exceed the maximum change in signal strength, the transmission power may be reduced by an amount corresponding to the maximum change to at least partially reduce the interference to the first wireless radio.

To determine the target transmission power for the second wireless radio that would at least partially eliminate interference with the first wireless radio, an isolation value for the antennae used by the second wireless radio may be determined. The isolation value may represent a target effective isolation between antennae that would reduce or eliminate the interference. In cases where the wireless radios may not be physically spaced a sufficient distance to provide this isolation, reduction of the transmission power of the second wireless radio may increase the effective isolation between the antennae. In some implementations, each antenna may have a specified isolation value, depending on the configuration, radiation pattern, or other characteristics of the antenna. As such, a target isolation value for an antenna may be stored as isolation data and accessed during a process to determine the target transmission power. In cases where the second wireless radio uses multiple antennae, each antenna having a respective isolation value, the lowest isolation value may be used.

In addition to the isolation value for the second wireless radio, the signal strength for each communication link associated with the first wireless radio may be determined. For example, the first wireless radio may communicate with one or multiple devices using Bluetooth® or Bluetooth® Low Energy protocols, and signals received from each device may have a respective received signal strength indicator (RSSI) or another indication of signal strength, such as a received channel power indicator (RCPI). In some implementations, the RSSI, RCPI, or other signal strength values associated with the first wireless radio may include average values. For example, the signal strength value may include a moving average determined by calculating the mean, mode, or median value associated with a fixed count of previous signals strength measurements, such as the previous ten RSSI values determined for the first wireless radio. In cases where the first wireless radio communicates with multiple devices, each communication link having a respective signal strength, the lowest signal strength value may be used.

Based on the lowest signal strength value for the first wireless radio, a maximum interference value associated with the second wireless radio may be determined. The maximum interference value may represent the greatest signal strength of the second wireless radio that may be achieved without generating interference in excess of a threshold interference level that affects communications using the first wireless radio. Typically, the relationship between the signal strength of the first wireless radio and the maximum interference value for the second wireless radio varies based on a non-linear function in which the maximum interference value increases as the signal strength for the first wireless radio increases. In some implementations, a look up table, a database, or another type of data structure may store signal strength values for the first wireless radio in association with corresponding maximum interference values for the second wireless radio.

Based on the minimum isolation value for the antennae used by the second wireless radio and the maximum interference value for the second radio, determined based on the minimum signal strength for the communication(s) of the first wireless radio, a target maximum transmission power for the second wireless radio that would at least partially mitigate interference with the first wireless radio may be determined, as illustrated in Equation 1:

$$MTP = TIV + MIV - \text{Offset} \qquad \text{(Equation 1)}$$

In Equation 1, MTP represents the target maximum transmission power of the second wireless radio that would at least partially mitigate interference with communications using the first wireless radio. TIV represents the target isolation value of the antenna(e) associated with the second wireless radio. If the first wireless radio uses multiple antennae, TIV may represent the minimum isolation value selected from the target isolation values for each antenna of the first wireless radio. MIV represents the maximum interference value associated with the second wireless radio. As described previously, the maximum interference value may be determined using a look up table or other data structure that associates maximum interference values with respective values for the signal strength of the first wireless radio. In cases where the first wireless radio communicates with multiple devices via multiple communication links, the communication link having the lowest signal strength may be used to determine the corresponding maximum interference value. The Offset in Equation 1 may include any constant, such as 5 decibels (dB), that may be used to accommodate the peak to average power ratio (PAPR) or other fluctuations in signal strength that may occur when using the second wireless radio.

To determine whether the current transmission power for the second wireless radio may be reduced to the target transmission power without impacting the quality of communications using the second wireless radio, a maximum change in the signal strength associated with the second wireless radio may be determined. To determine the maximum change in signal strength, the RSSI, RCPI, or other signal strength value associated with communications using the second wireless radio may be determined. In some implementations, the signal strength values for the second wireless radio may include average values, such as a moving average determined using a fixed count of previous signal strength measurements. In cases where the second wireless radio communicates with multiple devices, such as multiple access points, the smallest signal strength value may be used. A difference between the smallest signal strength value and a minimum threshold signal strength may be used to determine the maximum change in signal strength for the second wireless radio. If the RSSI, RCPI, or other signal strength value for the second wireless radio falls below the minimum threshold signal strength, the quality of communications using the second wireless radio may be negatively affected. In some implementations, the minimum threshold signal strength may include a default value or user input value. In other implementations, the minimum threshold signal strength may vary dynamically based on the content that is communicated using the second wireless radio.

In some implementations, the second wireless radio may communicate with various devices using both Wi-Fi® and Wi-Fi® Direct protocols. In such cases, the RSSI, RCPI, or other signal strength values for the Wi-Fi® communications may differ from those determined for the Wi-Fi® Direct communications. Additionally, the minimum threshold signal strength for the Wi-Fi® communications may differ from those associated with the Wi-Fi® Direct communications. For example, the minimum threshold signal strength for Wi-Fi® Direct communications may be lower than that for Wi-Fi® communications. In cases where multiple protocols are used to communicate with various devices, the difference between the current signal strength and minimum signal strength for each communication link may be determined. The maximum change in signal strength for the second wireless radio, that would avoid reducing the quality of communications for the second wireless radio below a threshold quality, would be smallest difference determined in this manner.

The maximum change in signal strength for the second wireless radio may therefore be determined based at least in part on Equation 2:

$$MCSS = SSV - TSSV \quad \text{(Equation 2)}$$

In Equation 2, MCSS represents the maximum change in signal strength of the second wireless radio that may occur without reducing the quality of communications using the second wireless radio below a threshold quality. SSV and TSSV represent the current signal strength value and minimum threshold signal strength value, respectively, for communications using the second wireless radio. In cases where the second wireless radio communicates with multiple devices, such as multiple access points, each communication link having a respective signal strength value, SSV may represent the lowest signal strength value for the communications using the second wireless radio. In cases where the second wireless radio communicates with various devices using multiple protocols, each protocol having a respective minimum threshold signal strength, SSV and TSSV may include the corresponding values determined to have the smallest difference between them.

Based on the current transmission power for the second wireless radio and the maximum transmission power for the second wireless radio, which may be determined based on Equation 1, the target change in the transmission power of the second wireless radio may be determined based on Equation 3:

$$TCTP = TP - MTP \quad \text{(Equation 3)}$$

In Equation 3, TCTP represents the target change in transmission power, TP represents the current signal transmission power of the second wireless radio, and MTP represents the maximum transmission power.

If the target change in transmission power is less than the maximum change in signal strength, the transmission power of the second wireless radio may be reduced by a value corresponding to the target change. However, if the target change exceeds the maximum change, then reducing the transmission power by a value corresponding to the target change may negatively impact the quality of communications using the second wireless radio. In some implementations, a user setting or preference may indicate that the quality of communications using the second wireless radio may be compromised in favor of avoiding interference with the first wireless radio, and the transmission power of the second wireless radio may be reduced by an amount corresponding to the target change. In other implementations, the transmission power of the second wireless radio may instead be reduced by an amount corresponding to the maximum change, which may at least partially reduce interference to the first wireless radio while maintaining the quality of communications using the second wireless radio.

In some cases, the maximum change in signal strength may be less than zero. For example, based on the content currently transmitted using the second wireless radio, the minimum threshold signal strength may exceed the current signal strength for communications associated with the second wireless radio. In some implementations, when the maximum change is less than zero, the transmission power of the second wireless radio may not be reduced, independent of the value of the target change in transmission power. In other implementations, the transmission power of the second wireless radio may be increased, rather than decreased, by a value corresponding to at least a portion of the maximum change. For example, a default configuration or user setting may indicate that improving the quality of communications using the second wireless radio is to be prioritized over avoiding interference to the first wireless radio. In still other implementations, in cases where the maximum change is less than zero, operation of the first and second wireless radios may be switched from simultaneous communication to alternate communication (e.g., time division duplex).

FIG. 1 depicts an implementation of a system 100 for configuring the transmission power of a first wireless radio 102(1) to at least partially reduce interference 104 from the first wireless radio 102(1) on communications using a second wireless radio 102(2). For example, a wireless communication device 106 may include a first wireless radio 102(1) and a second wireless radio 102(2), each of which may be used to communicate with various wireless devices 108. The wireless communication device 106 may include any type of computing device including, without limitation, a laptop computer or other personal computer, a smartphone, tablet computer, wearable computer, or other portable or mobile device, an automotive computer, a set-top box, a server, an audio or video output device, a remote control or game controller, an access point, and so forth. The wireless devices 108 may include, without limitation, any of the types of computing devices described with regard to the wireless communication device 106, or other types of computing devices.

Continuing the example, the first wireless radio 102(1) may communicate using a first protocol, such as Wi-Fi®, while the second wireless radio 102(2) may communicate using a second protocol, such as Bluetooth®. The first wireless radio 102(1) and second wireless radio 102(2) may each use one or more antennae 110 to transmit data. For example, the first wireless radio 102(1) may be associated with a first antenna 110(1) that transmits signals via a first communication link 112(1), using a Wi-Fi® protocol, to a first wireless device 108(1), which may include an access point. Communications transmitted to and received from the access point may be used to communicate with one or more devices remote from the wireless communication device 106, such as one or more servers 114. The first wireless radio 102(1) may also be associated with a second antenna 110(2) that transmits signals via a second communication link 112(2), using a Wi-Fi® Direct protocol, to the second wireless device 108(2), which may include a remote control device or other device proximate to the wireless communication device 106. The first antenna 110(1) may also be used to transmit signals to the first wireless device 108(1), and the second antenna 110(2) may be used to transmit signals to the second wireless device 108(2). In some cases, the first wireless radio 102(1) may communicate with the first wireless device 108(1) and the second wireless device 108(2) using time-division-duplex communication. The second wireless radio 102(2) may be associated with a third antenna 110(3), which may transmit signals via a third communication link 112(3), using a Bluetooth® protocol, to a third wireless device 108(3), which may include an audio output device such as a speaker. While FIG. 1 depicts an example system 100 in which the first wireless radio 102(1) uses two antennae 110 and the second wireless radio 102(2) uses a single antenna 110, other implementations may include any number of wireless radios 102 and any number of antennae 110 associated with a particular wireless radio 102. Additionally, while FIG. 1 depicts each antenna 110 communicating with a single wireless device 108 using a single communication link 112, in other implementations, an antenna 110 may be used, such as via time-division-duplex communication, to transmit signals to multiple wireless devices 108.

Operation of the first wireless radio 102(1) may generate interference 104 that reduces the signal strength or quality of communications using the second wireless radio 102(2). For example, when the first wireless radio 102(1) is used to transmit signals to one or more wireless devices 108, these signals may be detectable by the second wireless radio 102(2), and the noise associated with the signals may reduce the ability of the second wireless radio 102(2) to receive signals from wireless devices 108. The antennae 110 used by the first wireless radio 102(1) and those of the second wireless radio 102(2) may be spaced by a distance (D), which may provide some isolation between the antennae 110 and reduce the interference 104. However, due to physical constraints, such as the size of the housing of the wireless communication device 106, it may not be possible to space the antennae 110 a sufficient distance to mitigate the interference 104. Reduction in the transmission power associated with the first wireless radio 102(1) may reduce the strength of the signals transmitted by the first wireless radio 102(1), which may further reduce the interference 104 on communications using the second wireless radio 102(2).

A power configuration module 116 associated with the wireless communication device 106 may modify the transmission power of the first wireless radio 102(1) based in part on signal strength data 118 associated with each communication link 112. For example, first signal strength data 118(1) may include a RSSI, RCPI, or other indication of signal strength determined based on communications between the first wireless radio 102(1) and one or more of the first wireless device 108(1) or the second wireless device 108(2). For example the first signal strength data 118(1) may include a first signal strength value (e.g., an average signal strength value) associated with communication between the first wireless radio 102(1) and the first wireless device 108(1) and a second signal strength value associated with communication between the first wireless radio 102(1) and the second wireless device 108(2). Second signal strength data 118(2) may include a RSSI, RCPI, or other indication of signal strength determined based on communications between the second wireless radio 102(2) and the third wireless device 108(3).

Based on the signal strength data 118(2) associated with communication using the second wireless radio 102(2), the power configuration module 116 may determine a maximum interference value associated with the first wireless radio 102(1). The maximum interference value may represent a maximum signal strength associated with communications with the first wireless radio 102(1) that may be achieved without generating interference 104 greater than a threshold quantity of interference that affects communications using the second wireless radio 102(2). In some implementations, the maximum interference value may be determined by accessing a look up table, database, or other data structure that associates values of signal strength data 118(2) for the second wireless radio 102(2) with corresponding maximum interference values. The power configuration module 116 may also access isolation data 120, indicative of one or more target isolation values corresponding to one or more of the wireless radios 102 or to the antennae 110 associated therewith. As discussed previously, the target isolation value and the maximum interference value may be used to determine a target maximum transmission power associated with the first wireless radio 102(1) that may mitigate interference 104 on communications using the second wireless radio 102(2). For example, the maximum transmission power may be determined based at least in part on Equation 1, above.

A target change in the transmission power of the first wireless radio 102(1) and a maximum change in the signal strength of the first wireless radio 102(1) may be determined based on the first signal strength data 118(1), associated with communications using the first wireless radio 102(1), and the current transmission power of the first wireless radio 102(1). For example, the target change in transmission power may be determined based on the current transmission power of the second wireless radio 102(2) and the maximum transmission power, as indicated in Equation 3, above. The maximum change in signal strength for the first wireless radio 102(1) may be determined based on the minimum signal strength value determined from the first signal strength data 118(1) and threshold data 122, as indicated in Equation 2, above. For example, if a signal strength value associated with communication between the first wireless radio 102(1) and the second wireless device 108(2) is less than the signal strength value associated with communication with the first wireless device 108(1), the maximum change in signal strength may be determined based on the signal strength value for the second wireless device 108(2). Threshold data 122 may include minimum signal strength values associated with communication using the first wireless radio 102(1) or one or more of the first antenna 110(1) or the second antenna 110(2) that will not reduce the quality of communications using the first wireless radio 102(1) below a threshold quality. In some implementations, the threshold data 122 may include multiple threshold values that correspond to different types of content that may be communicated using the first wireless radio 102(1). For example, communication of data to a server 114 using a Wi-Fi® protocol may have a greater minimum threshold signal strength than communication of data to a remote control using a Wi-Fi® Direct protocol. As another example, the type of modulation used when transmitting data packets may affect the minimum threshold signal strength.

Based at least in part on the target change in transmission power and the maximum change in signal strength, the power configuration module 116 may generate power configuration data 124, which may be provided to the first wireless radio 102(1) to cause a change in the transmission power thereof. If the target change in transmission power is less than the maximum change in signal strength, the power configuration data 124 may be configured to cause the first wireless radio 102(1) to reduce transmission power by an amount corresponding to the target change. If the target change in transmission power would cause the first wireless radio 102(1) to exceed the maximum change in signal strength, the power configuration data 124 may be configured to cause the first wireless radio 102(1) to reduce transmission power by an amount corresponding to the maximum change. If the maximum change is less than or equal to zero, the power configuration data 124 may be configured to maintain the current transmission power for the first wireless radio 102(1), or in other implementations, the power configuration module 116 may not generate power configuration data 124. In still other implementations, if the maximum change is less than or equal to zero the power configuration data 124 may be configured to increase the current transmission power of the first wireless radio 102(1) or to cease simultaneous operation of the wireless radios 102 (e.g., full duplex communication) and begin alternate operation of the wireless radios 102 (e.g., time division duplex communication).

While FIG. 1 depicts the power configuration module 116 associated with the wireless device 106, in other implementations, one or more functions described with regard to the power configuration module 116 may be performed by other devices in communication with the wireless communication device 106. For example, any combination of the wireless communication device 106, one or more of the wireless devices 108, the server(s) 114, or any other computing device(s) in communication with the wireless communication device 106 may be used to perform any of the functions described with regard to the power configuration module 116.

Figure 2:
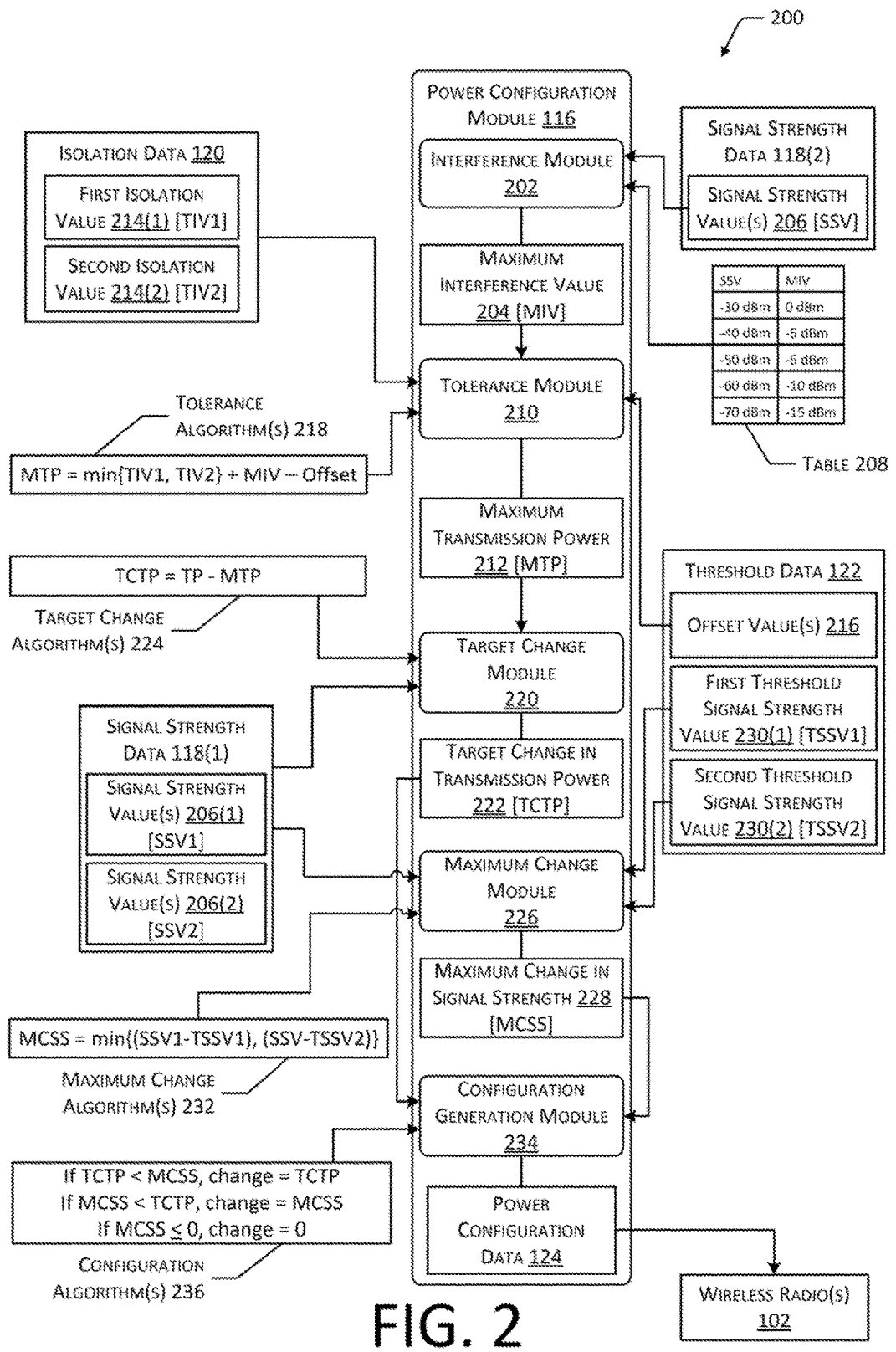
FIG. 2 is a block diagram depicting generation of power configuration data based on signal strength data determined from communications between wireless radios and wireless devices.

FIG. 2 is a block diagram 200 depicting generation of power configuration data 124 based on signal strength data 118 determined from communications between wireless radios 102 and wireless devices 108. As described with regard to FIG. 1, a power configuration module 116 associated with the wireless communication device 106, or one or more computing devices in communication with the wireless communication device 106, may be used to determine the manner in which the transmission power of a first wireless radio 102(1) may be modified to reduce interference 104 on communications using a second wireless radio 102(2). For example, FIG. 2 depicts an interference module 202 associated with the power configuration module 116. The interference module 202 may determine a maximum interference value 204 associated with the first wireless radio 102(1). The maximum interference value 204 may represent a maximum signal strength that may be achieved by the first wireless radio 102(1) without generating interference 104 with communications using the second wireless radio 102(2) that exceeds a threshold quantity of interference 104. The maximum interference value 204 may be determined based at least in part on the signal strength data 118(2) determined from communications using the second wireless radio 102(2). For example, the signal strength data 118(2) may include one or more signal strength values 206, such as RSSI or RCPI values, associated with communications using the second wireless radio 102(2). In one implementation, the interference module 202 may access a table 208 or other data structure that associates signal strength values 206 with corresponding values for the maximum interference value 204. In cases where the second wireless radio 102(2) communicates with multiple wireless devices 108 via multiple communication links 112, the signal strength data 118(2) may include multiple signal strength values 206. In such cases, the interference module 202 may determine the maximum interference value 204 that corresponds to the smallest signal strength value 206 determined from the signal strength data 118(2).

A tolerance module 210 associated with the power configuration module 116 may determine the maximum transmission power 212 for the first wireless radio 102(1) that would avoid generating interference 104 in excess of a threshold quantity with regard to communications using the second wireless radio 102(2). In some implementations, the maximum transmission power 212 may be determined using Equation 1, above. The tolerance module 210 may access isolation data 120, which may include one or more target isolation values 214 associated with antennae 110 used by the first wireless radio 102(1). For example the isolation data 120 may include a first isolation value 214(1) associated with the first antenna 110(1) and a second isolation value 214(2) associated with the second antenna 110(2). In some implementations, the isolation values 214 for particular antennae 110 may include preset or default values based on one or more characteristics of the antennae 110, such as the size, materials, radiation pattern, or configurations thereof. In other implementations, the tolerance module 210 or another module in communication therewith may be configured to measure isolation values 214 for the antennae 110 based on one or more of signal strength values 206, noise, and interference 104 determined using each antenna 110.

The tolerance module 210 may also access threshold data 122, which may include one or more offset values 216. Offset values 216 may include fixed values (e.g., constants), such as 5 decibels (dB), or another value, that may be used to accommodate for fluctuations in signal strength that may occur when using the first wireless radio 102(1). The tolerance module 210 may also determine the maximum interference value 204, determined by the interference module 202. Based on the isolation value(s) 214, the maximum interference value 204, the offset value(s) 216, and one or more tolerance algorithms 218, the tolerance module 210 may determine the maximum transmission power 212. For example, as described in Equation 1, above, the maximum transmission power 212 may be determined based on the sum of the target isolation value 214 for the first wireless radio 102(1) and the maximum interference value 204, minus an offset value 216. In cases where the isolation data 120 includes multiple isolation values 214 for the antennae 110 used by the first wireless radio 102(1), the smallest of the isolation values 214 may be used. For example, FIG. 2 depicts an example tolerance algorithm 218 as "MTP=min{TIV1, TIV2}+MIV−Offset".

A target change module 220 associated with the power configuration module 116 may determine a target change in the transmission power 222 based in part on the maximum transmission power 212. The target change in transmission power 222 may represent the amount by which the transmission power of the first wireless radio 102(1) may be decreased to mitigate interference 104 to communications using the second wireless radio 102(2). As described previously with regard to Equation 3, the target change in transmission power 222 may be determined based on the current transmission power associated with the first wireless radio 102(1) and the maximum transmission power 212 determined by the tolerance module 210. The target change module 220 may determine the current transmission power based on signal strength data 118(1) or other data indicative of the transmission power, received from the first wireless radio 102(1). In some cases, the signal strength data 118(1) may include multiple signal strength values 206. Based on the current transmission power, the maximum transmission power 212, and one or more target change algorithms 224, the target change module 220 may determine the target change in transmission power 222. For example, FIG. 2 depicts an example target change algorithm 224 as "TCTP=TP−MTP".

A maximum change module 226 associated with the power configuration module 116 may determine a maximum change in signal strength 228 for the first wireless radio 102(1). The maximum change in signal strength 228 may represent an amount by which the signal strength of the first wireless radio 102(1) may be decreased without decreasing the quality of communications using the first wireless radio 102(1) below a threshold quality. The maximum change in signal strength 228 may be determined based on the signal strength value(s) 206 associated with the first wireless radio 102(1) and one or more threshold signal strength values 230, as indicated in Equation 2, above. For example, the threshold data 122 may include a first threshold signal strength value 230(1) associated with communications between the first wireless radio 102(1) and a first wireless device 108(1) using a first protocol, such as Wi-Fi®. The threshold data 122 may also include a second threshold signal strength value 230(2) associated with communications between the first wireless radio 102(1) and a second wireless device 108(2) using a second protocol, such as Wi-Fi® Direct. In some implementations, the threshold signal strength values 230 may include dynamic values that vary based on the content sent or received using the first wireless radio 102(1) or characteristics of the wireless devices 108 with which the first wireless radio 102(1) communicates. In other implementations, the threshold data 122 may include a table or other data structure that associates particular threshold signal strength values 230 with particular types of content, protocols, data rates, modulations, or wireless devices 108. The threshold signal strength value(s) 230 may indicate a minimum signal strength for a particular communication link 112 that prevents the quality of communications using the first wireless radio 102(1) from degrading to a level less than a threshold quality. As such, the maximum change in signal strength 228 may be determined based on the difference between a current signal strength value 206 for a communication link 112 and a corresponding threshold signal strength value 230. In cases where the first wireless radio 102(1) communicates using multiple communication links 112, the maximum change in signal strength 228 may be determined based on the signal strength value 206 and corresponding threshold signal strength value 230 having the smallest difference. For example, FIG. 2 depicts an example maximum change algorithm 232 that may be used to determine the maximum change in signal strength 228 as "MCSS=min{(SSV1−TSSV1), (SSV2−TSSV2)}".

A configuration generation module 234 associated with the power configuration module 116 may generate power configuration data 124 to modify the transmission power of one or more wireless radios 102 based on the target change in transmission power 222, the maximum change in signal strength 228, and one or more configuration algorithms 236. The configuration algorithm(s) 236 may indicate particular operations to be performed based on the relationship between the target change in transmission power 222 and the maximum change in signal strength 228. For example, the configuration algorithms 236 may indicate that if the target change in transmission power 222 is less than the maximum change in signal strength 228, the transmission power of the first wireless radio 102(1) is to be decreased by an amount equal to the target change in transmission power 222. However, if the maximum change in signal strength 228 is less than the target change in transmission power 222, the transmission power of the first wireless radio 102(1) may be decreased by an amount corresponding to the maximum change in signal strength 228. If the maximum change in signal strength 228 is less than or equal to zero, the transmission power of the first wireless radio 102(1) may remain unchanged. In some implementations, if the maximum change in transmission power 228 is less than zero, the transmission power of the first wireless radio 102 may be increased by an amount equal to at least a portion of the difference between the maximum change in signal strength 228 and zero. In other implementations, if the maximum change in signal strength 228 is less than or equal to zero, the wireless communication device 106 may switch from use of multiple wireless radios 102 simultaneously to alternate use of the wireless radios 102.

Figure 3:
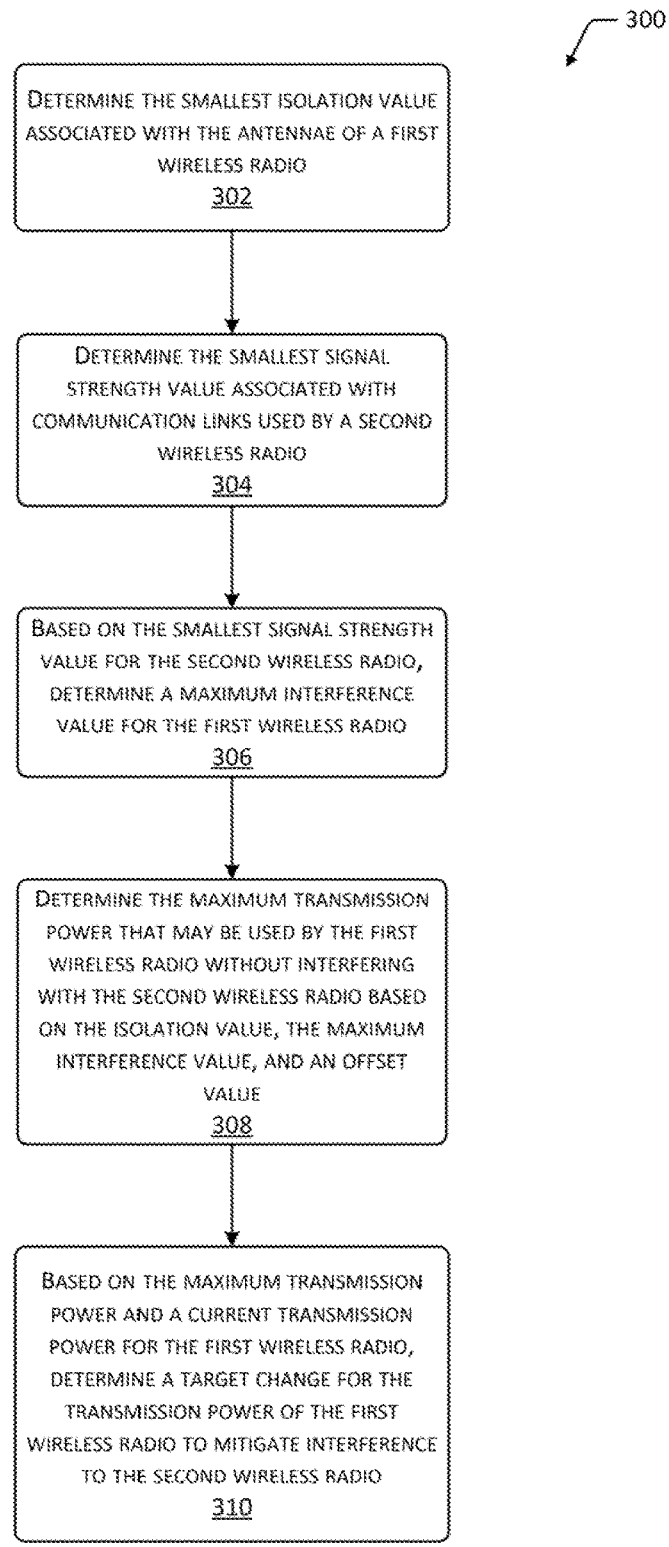
FIG. 3 is a flow diagram illustrating a method for determining a change in transmission power for a first wireless radio that eliminates interference to communications using a second wireless radio.

FIG. 3 is a flow diagram 300 illustrating a method for determining a change in transmission power for a first wireless radio 102(1) that at least partially reduces interference 104 to communications using a second wireless radio 102(2). Block 302 determines the smallest isolation value 214 associated with the antennae 110 used by a first wireless radio 102(1). For example, the first wireless radio 102(1) may be associated with multiple antennae 110, each antenna 110 having different characteristics, such as a different size, radiation pattern, and so forth. In some implementations, different antennae 110 used by the first wireless radio 102(1) may communicate with different devices using different protocols. For example, a first antenna 110(1) and a second antenna 110(2) may communicate using a Wi-Fi® or Wi-Fi® Direct protocols. In some implementations, each antenna 110 may include a corresponding isolation value 214, stored as isolation data 120. In other implementations, an isolation value 214 for one or more antennae 110 may be measured based on communications with wireless devices 108 using the antennae 110, interference 104 generated during use of the antennae 110, and so forth. In cases where the first wireless radio 102(1) uses only a single antenna 110, the isolation value 214 that corresponds to that antenna 110 may be used for further determinations, and block 302 may be omitted.

Block 304 determines the smallest signal strength value 206 associated with communication links 112 used by a second wireless radio 102(2). For example, the second wireless radio 102(2) may communicate with various wireless devices 108 using one or more protocols, such as Bluetooth® or Bluetooth® Low Energy. Each communication may have an associated RSSI, RCPI, or other signal strength value 206. The signal strength value 206 associated with a particular communication link 112 may include an average value determined for a period of time or based on a fixed count of previous signal strength measurements. In cases where the second wireless radio 102(2) communicates with only a single wireless device 108, the signal strength value 206 for that communication link 112 may be used for further determinations, and block 304 may be omitted.

Block 306 determines, based on the smallest signal strength value 206 for the second wireless radio 102(2), a maximum interference value 204 for the first wireless radio 102(1). The maximum interference value 204 may indicate a signal strength or other metric value associated with the first wireless radio 102(1) that would avoid generating interference 104 in excess of a threshold quantity with regard to communications using the second wireless radio 102(2). In some implementations, the maximum interference value 204 may be determined using a table 208 or other data structure that associates signal strength values 206 with corresponding maximum interference values 204.

Block 308 determines a maximum transmission power 212 that may be used by the first wireless radio 102(1) without generating interference 104 with the second wireless radio 102(2) that exceeds a threshold quantity of interference. The maximum transmission power 212 may be determined based on the isolation value 214, the maximum interference value 204, and an offset value 216. For example, FIG. 2 depicts an example tolerance algorithm 218 that may be used to determine the maximum transmission power 212 based on the sum of a minimum isolation value 214 and the maximum interference value 204, minus an offset value 216 that may compensate for fluctuations in signal strength associated with the first wireless radio 102(1).

Block 310 determines, based on the maximum transmission power 212 and a current transmission power for the first wireless radio 102(1), a target change in transmission power 222 of the first wireless radio 102(1) to at least partially mitigate interference 104 to the second wireless radio 102(1). For example, Equation 3, above, illustrates that a target change in transmission power 222 may be determined based on the difference between a current transmission power and the maximum transmission power 212.

Figure 4:
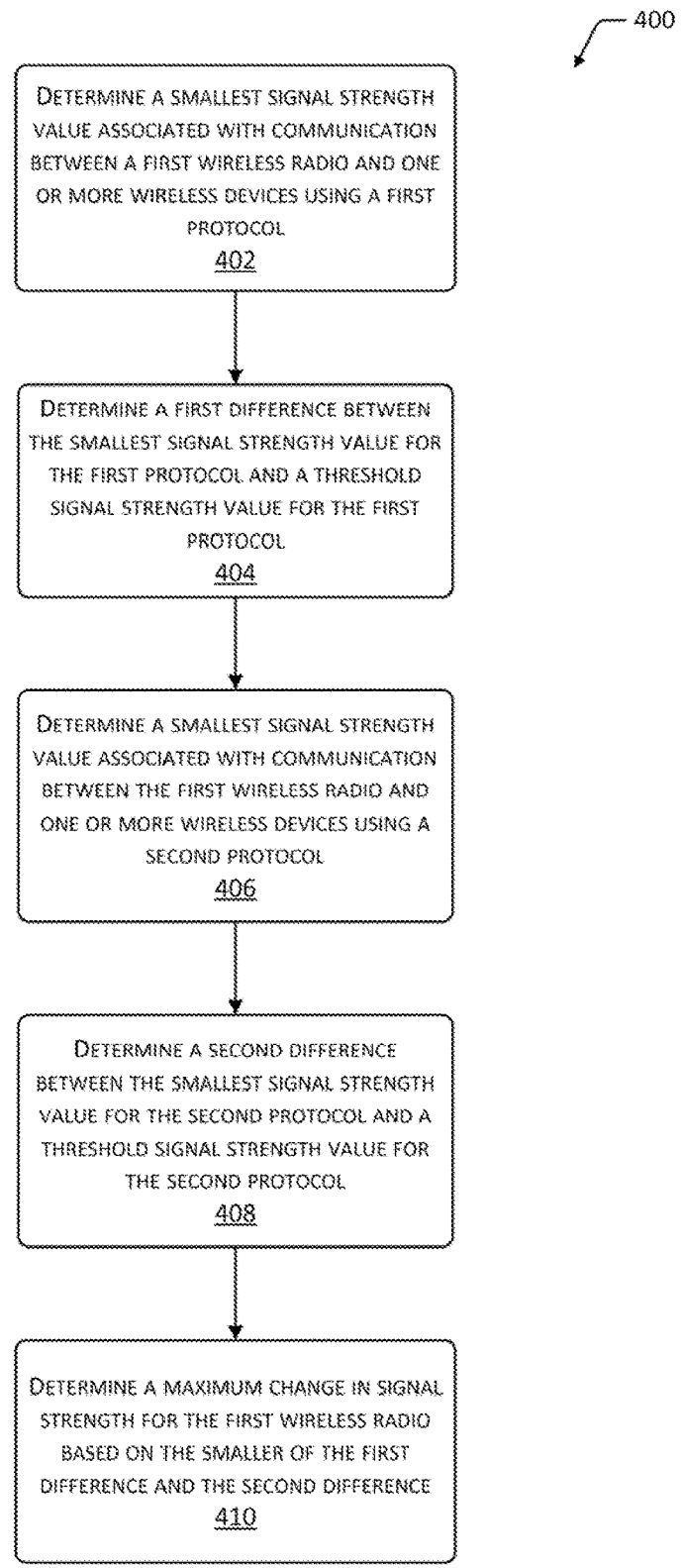
FIG. 4 is a flow diagram illustrating a method for determining a maximum change in transmission power for a first wireless radio that avoids reducing the quality of communications using the first wireless radio to a level less than a threshold quality.

FIG. 4 is a flow diagram 400 illustrating a method for determining a maximum change in signal strength 228 for a first wireless radio 102(1) that avoids reducing the quality of communications using the first wireless radio 102(1) to a level less than a threshold quality. Block 402 determines a smallest signal strength value 206 associated with communication between a first wireless radio 102(1) and one or more wireless devices 108 using a first protocol. The smallest signal strength value 206 may include an average signal strength value 206 determined for a particular time period or based on a fixed count of previous signal strength measurements. For example, a wireless radio 102 may communicate with multiple access points or other types of wireless devices using a Wi-Fi® protocol, or multiple wireless devices 108 within a particular environment using a Wi-Fi® direct protocol. Each communication link 112 with a wireless device 108 may have an associated RSSI, RCPI, or other signal strength value 206. In cases where the first wireless radio 102(1) communicates with only a single wireless device 108 using the first protocol, the signal strength value 206 associated with that communication link 112 may be used for subsequent determinations, and Block 402 may be omitted.

Block 404 determines a first difference between the smallest signal strength value 206 for the first protocol and a threshold signal strength value 230 for the first protocol. The threshold signal strength value 230 may represent a minimum signal strength for communications between the first wireless radio 102(1) and a wireless device 108 that prevents a degradation in the quality of the communications to a level below a threshold level of quality. The first difference may therefore represent an amount by which the signal strength of a communication using the first wireless radio 102(1) may decrease without reducing the quality of the communication below the threshold level.

Block 406 determines a smallest signal strength value 206 associated with communication between the first wireless radio 102(1) and one or more wireless devices 108 using a second protocol. Block 408 determines a second difference between the smallest signal strength value 206 for the second protocol and a threshold signal strength value 230 for the second protocol. For example, the first wireless radio 102(1) may communicate with one or more first wireless devices 108(1) using a first protocol, such as Wi-Fi®, and one or more second wireless devices 108(2) using a second protocol, such as Wi-Fi® Direct. Each protocol may have a respective average signal strength value 206 and a respective threshold signal strength value 230 indicative of a signal strength that prevents degradation of the quality of a communication below a threshold level of quality. In cases where the first wireless radio 102(1) does not communicate using a second protocol, blocks 406 and 408 may be omitted, and subsequent determinations may be performed using the first difference.

Block 410 determines a maximum change in signal strength 228 for the first wireless radio 102(1) based on the smaller of the first difference and the second difference. As discussed previously, the difference between a signal strength value 206 and a threshold signal strength value 230 for a particular protocol may represent the amount by which the signal strength for a communication link 112 may be decreased without decreasing the quality of communications using the wireless radio 102 below a threshold quality. Therefore, the smaller of the first difference and the second difference may limit the amount by which the signal strength of the first wireless radio 102(1) may be decreased without negatively impacting the quality of communications using the first wireless radio 102(1), and as such, the smaller of the first difference and the second difference may be used to determine the maximum change in signal strength 228.

Figure 5:
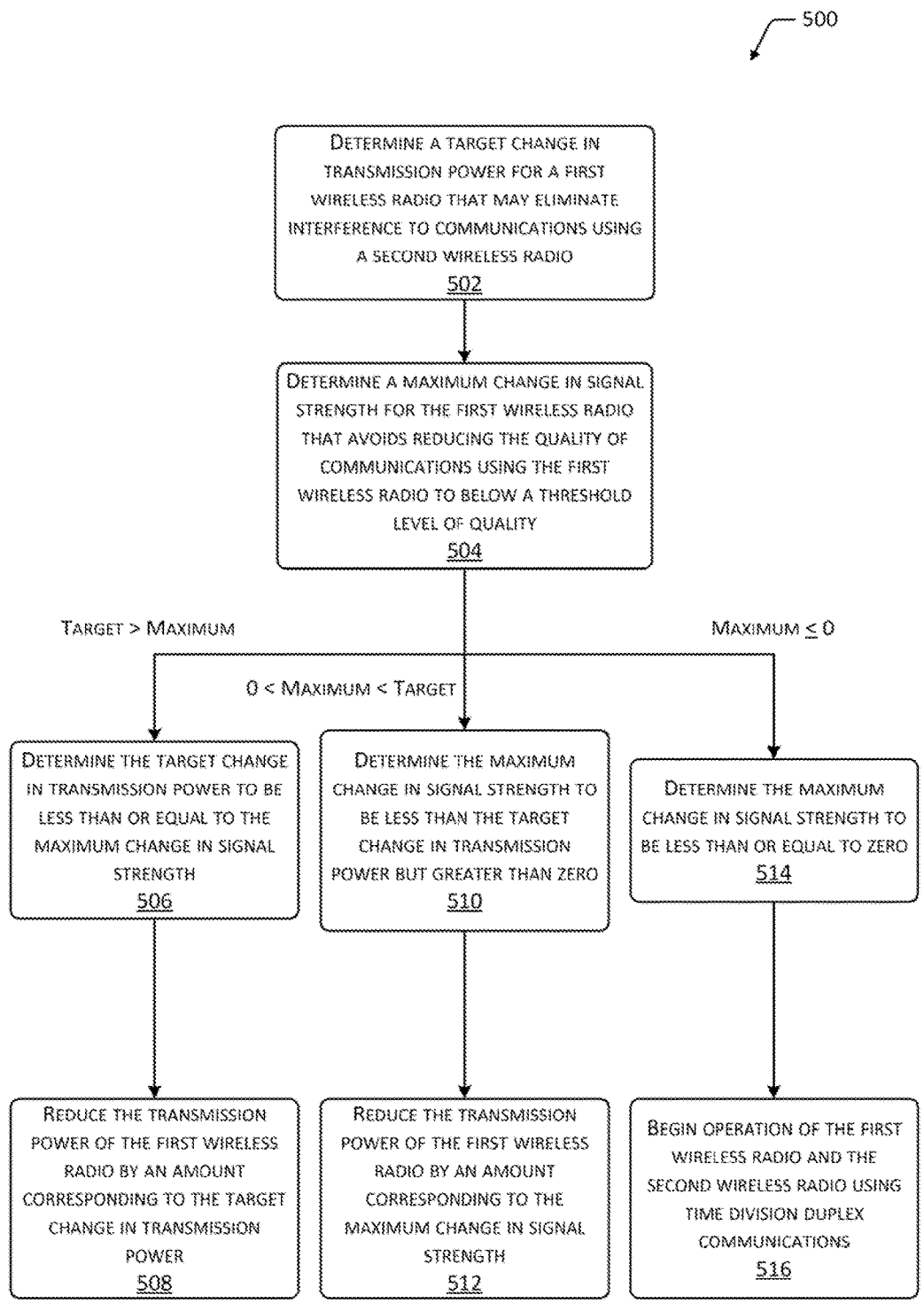
FIG. 5 is a flow diagram illustrating a method for determining a reduction in the transmission power of a first wireless radio based on a target change in transmission power to eliminate interference and a maximum change in transmission power to maintain communication quality.

FIG. 5 is a flow diagram 500 illustrating a method for determining a reduction in the transmission power of a first wireless radio 102(1) based on a target change in transmission power 222 to eliminate interference and a maximum change in signal strength 228 to maintain communication quality. Block 502 determines a target change in transmission power 222 for a first wireless radio 102(1) that may eliminate interference 104 to communications using a second wireless radio 102(2). One example method by which a target change in transmission power 222 may be determined is illustrated in FIG. 3. Block 504 determines a maximum change in signal strength 228 for the first wireless radio 102(1) that avoids reducing the quality of communications using the first wireless radio 102(1) to below a threshold level of quality. One example method by which a maximum change in signal strength 228 may be determined is illustrated in FIG. 4. Depending on the relationship between the target change in transmission power 222 and the maximum change in signal strength 228, the transmission power of the first wireless radio 102(1) may be modified in different manners. For example, as described with regard to FIGS. 1 and 2, a power configuration module 116 associated with a wireless communication device 106 may generate power configuration data 124 configured to modify the transmission power of the first wireless radio 102(1) based at least in part on the target change in transmission power 222 and the maximum change in signal strength 228.

Block 506 may determine that the target change in transmission power 222 is less than or equal to the maximum change in signal strength 228. If the target change in transmission power 222 is less than the maximum change in signal strength 228, then the transmission power of the first wireless radio 102(1) may be reduced by an amount based on the target change, thereby mitigating interference 104 on communications using the second wireless radio 102(2), without reducing the quality of communications using the first wireless radio 102(1) below a threshold quality. Thus, block 508 may reduce the transmission power of the first wireless radio 102(1) by an amount corresponding to the target change in transmission power 222.

Block 510 may determine that the maximum change in signal strength 228 is less than the target change in transmission power 222 but greater than zero. If the maximum change in signal strength 228 is less than the target change in transmission power 222, then the transmission power of the first wireless radio 102(1) may not be reduced by an amount based on the target change without reducing the quality of communications using the first wireless radio 102(1) below a threshold quality. However, reduction of the transmission power of the first wireless radio 102(1) by an amount less than the target change in transmission power 222 may at least partially reduce the interference 104 caused by the first wireless radio 102(1). Therefore, block 512 may reduce the transmission power of the first wireless radio 102(1) by an amount corresponding to the maximum change in signal strength 228.

Block 514 may determine that the maximum change in signal strength 228 is less than or equal to zero. For example, independent of the interference 104 to the second wireless radio 102(2) caused by operation of the first wireless radio 102(1), the signal strength achieved by the first wireless radio 102(1) may be insufficient to maintain a threshold level of quality. Continuing the example, the first wireless radio 102(1) may be transmitting or receiving a type of content that utilizes a large quantity of airtime or other network or computational resources or the communication channel used by the first wireless radio 102(1) may be congested, affected by noise, and so forth. Under such circumstances, reduction of the transmission power of the first wireless radio 102(1) would further reduce the quality of communications using the first wireless radio 102(1).

As such, block 516 may begin operation of the first wireless radio 102(1) and the second wireless radio 102(2) using time division duplex communications rather than full duplex (e.g., simultaneous) communications. By using the wireless radios 102 in an alternate manner, interference 104 caused by operation of one wireless radio 102 on communications using another wireless radio 102 may be eliminated, and resources consumed by operation of one wireless radio 102 may not be consumed during times when another wireless radio 102 is being operated.

In another implementation, rather than operating the wireless radios 102 using time division duplex communications, simultaneous operation of the wireless radios 102 may be continued, but without reducing the transmission power of the first wireless radio 102(1). In yet another implementation, the transmission power of the first wireless radio 102(1) may be decreased regardless of the effect on the quality of communications using the first wireless radio 102(1), to reduce interference 104 on communications using the second wireless radio 102(2). In still another implementation, the transmission power of the first wireless radio 102(1) may be increased regardless of the effect on the quality of communications using the second wireless radio 102(2), to increase the quality of communications using the first wireless radio 102(1). The prioritizing of communications using a particular wireless radio 102 may be determined based on one or more user settings or preferences, or one or more default settings. In other implementations, certain types of content may be prioritized over other types of content, or content may be prioritized based on the computing resources used to transmit the content.

Figure 6:
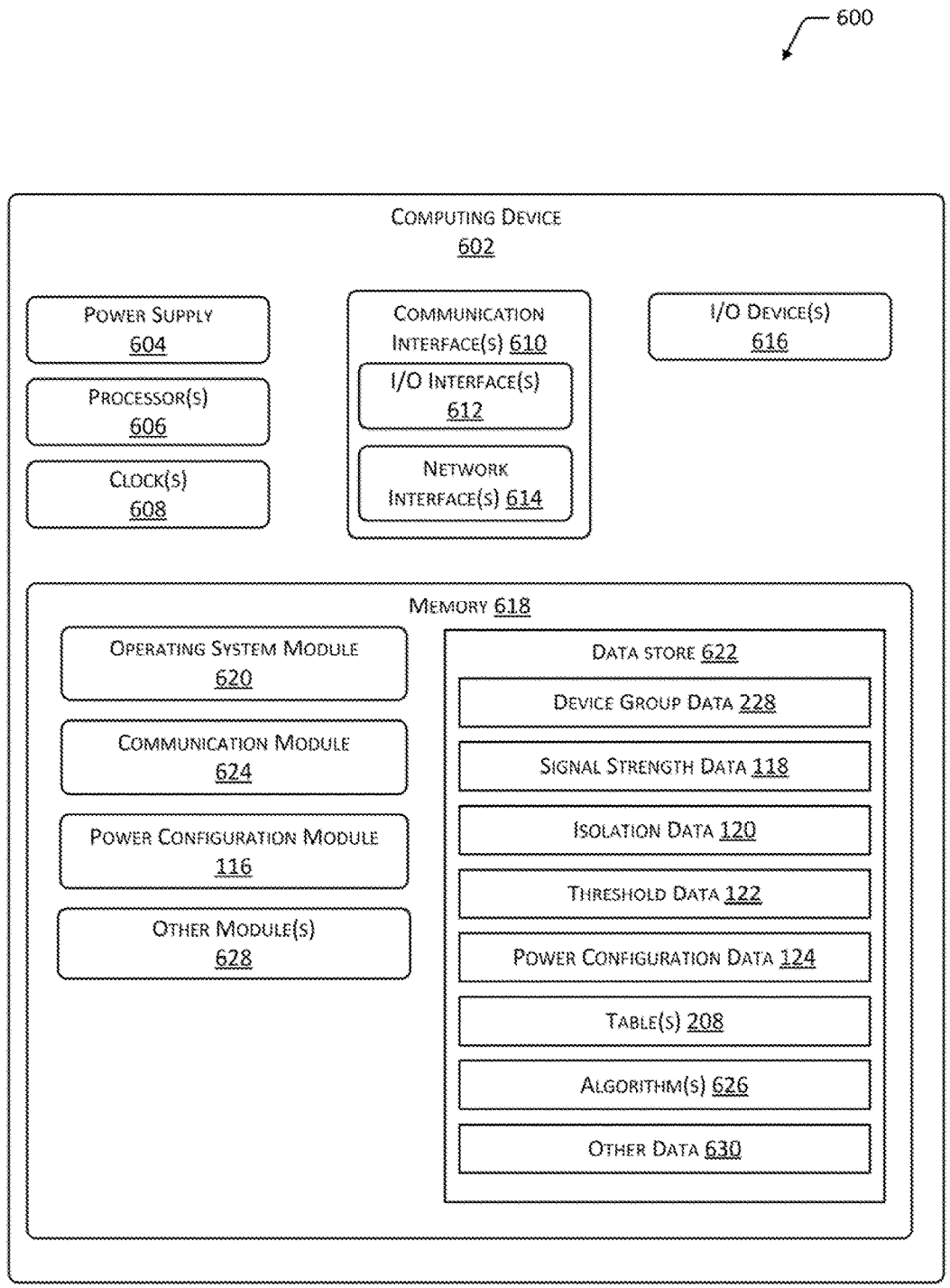
FIG. 6 is a block diagram illustrating a computing device within the scope of the present disclosure.

FIG. 6 is a block diagram 600 illustrating a computing device 602 within the scope of the present disclosure. The computing device 602 may include a wireless communication device 106, as shown in FIG. 1. In other implementations, one or more of the functions described with regard to the computing device 602 may be performed by one or more wireless devices 108, servers 114, and so forth. Any number and any combination of one or multiple types of computing devices 602 may be used to perform any of the functions described herein, such as by using a distributed network of computing devices 602.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clocks 608 may provide information indicative of date, time, ticks, and so forth. For example, the processor(s) 606 may use data from the clock 608 to generate a timestamp, trigger a preprogrammed action, and so forth.

The computing device 602 may include one or more communication interface(s) 610, such as input/output (I/O) interface(s) 612, network interface(s) 614, and so forth. The communication interfaces 610 may enable the computing device 602, or components of the computing device 602, to communicate with other computing devices 602 or components thereof, such as by use of one or more wireless radios 102. The I/O interface(s) 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O device(s) 616. The I/O devices 616 may include any manner of input device or output device associated with the computing device 602 or with another computing device 602 in communication therewith. For example, I/O devices 616 may include touch sensors, keyboards, mouse devices, microphones, image sensors (e.g., cameras), scanners, displays, speakers, haptic devices, printers, motion sensors, location sensors, and so forth. In some implementations, the I/O device(s) 616 may be physically incorporated with a computing device 602 or may be externally placed.

The network interface(s) 614 may be configured to provide communications between the computing device 602 and other devices, such as the I/O devices 616, routers, access points, wireless devices 108, and so forth. The network interface(s) 614 may include devices configured to couple to one or more networks, including local area networks (LANs), wireless LANs, wide area networks (WANs), wireless WANs, and so forth. For example, the network interfaces 614 may include computing devices 602 compatible with Ethernet, Wi-Fi®, Wi-Fi Direct®, Bluetooth®, Bluetooth® Low Energy, ZigBee®, Z-Wave®, 3G, 4G, LTE, and so forth.

The computing device 602 may include one or more busses or other internal communications hardware or software that allows for the transfer of data between the various modules and components of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD™ operating system as promulgated by the FreeBSD® Project; UNIX® or a UNIX-like operating system; a variation of the Linux™ operating system as promulgated by Linus Torvalds; the Windows® operating system from Microsoft Corporation of Redmond, Wash., USA; or other operating systems.

A data store 622 and one or more of the following modules may also be stored in the memory 618. The modules may be executed as foreground applications, background tasks, daemons, and so forth. The data store 622 may use a flat file, database, linked list, tree, executable code, script, or other data structure to store information. In some implementations, the data store 622 or a portion of the data store 622 may be distributed across one or more other devices including other computing devices 602, network attached storage devices, and so forth.

A communication module 624 stored in the memory 618 may be configured to establish communications with wireless devices 108, or other computing devices 602, such as by using one or more wireless radios 102.

The memory 618 may also store the power configuration module 116, discussed previously with regard to FIGS. 1 and 2. The power configuration module 116 may determine signal strength data 118 associated with communications between wireless radios 102 and one or more wireless devices 108. Based on the signal strength data 118 for a particular wireless radio 102 (e.g., a non-aggressor wireless radio 102) and a table 208 or other data structure, a maximum interference value 204 for another wireless radio 102 (e.g., an aggressor wireless radio 102) that may interfere with the particular wireless radio 102 may be determined. Based on the maximum interference value 204 and isolation data 120 associated with antenna(e) 110 used by the aggressor wireless radio 102, a maximum transmission power 212 for the aggressor wireless radio 102 may be determined. The maximum transmission power 212 may represent a power for the aggressor wireless radio 102 that avoids generating interference 104 with communications using the non-aggressor wireless radio 102 that would exceed a threshold level of interference 104. Based on the maximum transmission power 212, signal strength data 118 associated with communications using the aggressor wireless radio 102, a current transmission power of the aggressor wireless radio 102, and threshold data 122, a target change in transmission power 222 and a maximum change in signal strength 228 may be determined. Based on these values, the power configuration module 116 may generate power configuration data 124 to modify the transmission power of the aggressor wireless radio 102. To determine one or more of the maximum interference value 204, maximum transmission power 212, target change in transmission power 222, maximum change in signal strength 228, or power configuration data 124, the power configuration module 116 may access one or more algorithms 626. The algorithms 626 may include, for example, one or more tolerance algorithms 218, target change algorithms 224, maximum change algorithms 232, configuration algorithms 236, and so forth, as described with regard to FIG. 2.

Other modules 628 may also be present in the memory 618. For example, encryption modules may be used to encrypt and decrypt communications between computing devices 602. User interface modules may be configured to receive and modify user settings, configurations, and preferences, default settings, threshold data 122, and so forth. For example a user configuration may indicate whether to prioritize communication quality associated with a first wireless radio 102(1) or that of a second wireless radio 102(2).

Other data 630 within the data store 622 may include default configurations and settings associated with computing devices 602. Other data 630 may also include security data, such as encryption keys and schema, access credentials, and so forth.

In different implementations, different computing devices 602 may have different capabilities or capacities. For example, servers 114 used to provide content to user devices may have significantly more processor 606 capability and memory 618 capacity compared to the processor 606 capability and memory 618 capacity of wireless devices 108.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a first communication device;
a second communication device;
one or more memories storing computer-executable instructions; and
one or more hardware processors to execute the computer-executable instructions to:
determine a maximum transmission power of the first communication device that corresponds to a threshold level of interference with communication using the second communication device;
determine a minimum signal strength value of the first communication device that corresponds to a threshold quality of communication using the first communication device;
based on the maximum transmission power and the minimum signal strength value, determine a target change in transmission power for the first communication device; and
modify a transmission power of the first communication device based at least in part on the target change in transmission power.

2. The system of claim 1, further comprising computer-executable instructions to:
determine an isolation value indicative of a quantity of isolation between a first antenna associated with the first communication device and a second antenna associated with the second communication device;
wherein the maximum transmission power is determined based in part on the isolation value.

3. The system of claim 1, further comprising computer-executable instructions to:
determine a signal strength value associated with communication using the second communication device;
wherein the maximum transmission power is determined based in part on the signal strength value.

4. The system of claim 1, further comprising computer-executable instructions to:
determine an isolation value indicative of a quantity of isolation between a first antenna associated with the first communication device and a second antenna associated with the second communication device;
determine a current signal strength value associated with communication using the second communication device; and
determine, based on the current signal strength value, a maximum interference value associated with communication using the first communication device;
wherein the maximum transmission power is determined based on the isolation value and the maximum interference value.

5. The system of claim 1, further comprising computer-executable instructions to:
determine a current signal strength value associated with communication using the first communication device;
determine a difference between the minimum signal strength value and the current signal strength value;
determine, based on the difference, a maximum change in transmission power associated with the first communication device; and
determine that the target change in transmission power is less than the maximum change in transmission power.

6. The system of claim 1, further comprising computer-executable instructions to:
determine a current signal strength value associated with communication using the first communication device;
determine a difference between the minimum signal strength value and the current signal strength value;
determine, based on the difference, a maximum change in transmission power associated with the first communication device; and
determine that the target change in transmission power is greater than the maximum change in transmission power, wherein the transmission power of the first communication device is modified based in part on the maximum change in transmission power.

7. A system comprising:
a first communication device;
a second communication device;
one or more memories storing computer-executable instructions; and
one or more hardware processors to execute the computer-executable instructions to:
determine a first signal strength value associated with communication using the second communication device;
determine, based on the first signal strength value, a second signal strength value associated with communication using the first communication device, wherein the second signal strength value corresponds to a threshold level of interference with communication using the second communication device;
determine, based at least in part on the second signal strength value, a maximum transmission power of the first communication device that corresponds to the threshold level of interference; and
modify a transmission power of the first communication device based at least in part on the maximum transmission power.

8. The system of claim 7, further comprising computer-executable instructions to:
determine a minimum signal strength value of the first communication device that corresponds to a threshold quality of communication using the first communication device; and
determine a target change in transmission power for the first communication device based in part on the minimum signal strength value and the maximum transmission power, wherein the transmission power of the first communication device is modified based in part on the target change in transmission power.

9. The system of claim 7, further comprising computer-executable instructions to:
  determine an isolation value indicative of a quantity of isolation between a first antenna associated with the first communication device and a second antenna associated with the second communication device;
  wherein the maximum transmission power is further determined based in part on the isolation value.

10. The system of claim 7, further comprising computer-executable instructions to:
  determine a minimum signal strength value of the first communication device that corresponds to a threshold quality of communication using the first communication device;
  determine a target change in transmission power for the first communication device based in part on the maximum transmission power;
  determine a current signal strength value associated with communication using the first communication device;
  determine a difference between the minimum signal strength value and the current signal strength value;
  determine, based on the difference, a maximum change in transmission power associated with the first communication device; and
  determine that the target change in transmission power is less than the maximum change in transmission power, wherein the transmission power of the first communication device is modified based in part on the target change in transmission power.

11. The system of claim 7, further comprising computer-executable instructions to:
  determine a target change in transmission power for the first communication device based in part on the maximum transmission power;
  determine a minimum signal strength value of the first communication device that corresponds to a threshold quality of communication using the first communication device;
  determine, based in part on the minimum signal strength value, a maximum change in transmission power associated with the first communication device; and
  determine that the target change in transmission power is greater than the maximum change in transmission power, wherein the transmission power of the first communication device is modified based in part on the maximum change in transmission power.

12. The system of claim 7, further comprising a third communication device and computer-executable instructions to:
  determine a third signal strength value associated with communication using the third communication device; and
  determine that the first signal strength value is less than the third signal strength value, wherein the second signal strength value is determined based on the first signal strength value in response to determining that the first signal strength value is less than the third signal strength value.

13. A system comprising:
  a first communication device;
  a second communication device;
  one or more memories storing computer-executable instructions; and
  one or more hardware processors to execute the computer-executable instructions to:
    determine a minimum signal strength value of the first communication device that corresponds to a threshold quality of communication using the first communication device;
    determine a maximum change in transmission power of the first communication device that corresponds to the minimum signal strength value; and
    modify a transmission power of the first communication device by an amount based at least in part on the maximum change in transmission power to reduce interference from the first communication device on communication using the second communication device.

14. The system of claim 13, further comprising computer-executable instructions to:
  determine a maximum transmission power of the first communication device that corresponds to a threshold level of interference with communication using the second communication device;
  based at least in part on the maximum transmission power, determine a target change in transmission power for the first communication device; and
  determine that the target change in transmission power is less than the maximum change in transmission power, wherein the transmission power of the first communication device is modified based in part on the target change in transmission power.

15. The system of claim 13, further comprising computer-executable instructions to:
  determine a first signal strength value associated with communication using the second communication device;
  determine, based on the first signal strength value, a second signal strength value associated with communication using the first communication device, wherein the second signal strength value corresponds to a threshold level of interference with communication using the second communication device;
  determine, based in part on the second signal strength value, a maximum transmission power of the first communication device that corresponds to the threshold level of interference; and
  based at least in part on the maximum transmission power, determine a target change in transmission power for the first communication device; and
  determine that the target change in transmission power is less than the maximum change in transmission power, wherein the transmission power of the first communication device is modified based in part on the target change in transmission power.

16. The system of claim 13, further comprising computer-executable instructions to:
  determine a first signal strength value associated with communication using the second communication device;
  determine, based on the first signal strength value, a second signal strength value associated with communication using the first communication device, wherein the second signal strength value corresponds to a threshold level of interference with communication using the second communication device;
  determine, based in part on the second signal strength value, a maximum transmission power of the first communication device that corresponds to the threshold level of interference;

based at least in part on the maximum transmission power, determine a target change in transmission power for the first communication device; and determine that the target change in transmission power is greater than the maximum change in transmission power, wherein the transmission power of the first communication device is modified based on the maximum change in transmission power in response to the target change in transmission power being greater than the maximum change in transmission power.

17. The system of claim 13, further comprising computer-executable instructions to:

determine an isolation value indicative of a quantity of isolation between a first antenna associated with the first communication device and a second antenna associated with the second communication device;

determine, based at least in part on the isolation value, a maximum transmission power of the first communication device that corresponds to a threshold level of interference with communication using the second communication device; and based at least in part on the maximum transmission power, determine a target change in transmission power for the first communication device, wherein the transmission power of the first communication device is further modified based in part on the target change in transmission power.

18. The system of claim 13, further comprising computer-executable instructions to:

determine an isolation value indicative of a quantity of isolation between a first antenna associated with the first communication device and a second antenna associated with the second communication device;

determine a signal strength value associated with communication using the second communication device; and determine, based on the signal strength value, a maximum interference value associated with communication using the first communication device;

determine a maximum transmission power of the first communication device that corresponds to a threshold level of interference with communication using the second communication device; and based at least in part on the maximum transmission power, determine a target change in transmission power for the first communication device, wherein the transmission power of the first communication device is further modified based in part on the target change in transmission power.

19. The system of claim 13, further comprising computer-executable instructions to:

determine a current signal strength value associated with communication using the first communication device; and determine a difference between the minimum signal strength value and the current signal strength value, wherein the maximum change in transmission power is determined based on the difference.

20. The system of claim 13, further comprising computer-executable instructions to:

determine a signal strength value associated with communication using the second communication device;

determine, based in part on the signal strength value, a maximum transmission power of the first communication device that corresponds to a threshold level of interference to communication using the second communication device; and based at least in part on the maximum transmission power, determine a target change in transmission power for the first communication device, wherein the transmission power of the first communication device is further modified based in part on the target change in transmission power.

* * * * *